United States Patent [19]
Menigaux et al.

[11] Patent Number: 5,373,570
[45] Date of Patent: Dec. 13, 1994

[54] PROCESS FOR FORMING A STRUCTURE WITH INTEGRATED OPTICAL WAVEGUIDE AND MIRROR, AND STRUCTURE OBTAINED

[75] Inventors: Louis Menigaux, Bures sur Yvette; Alain Carenco, Bourg la Reine, both of France

[73] Assignee: France Telecom, Paris, France

[21] Appl. No.: 93,814

[22] Filed: Jul. 19, 1993

[30] Foreign Application Priority Data

Jul. 21, 1992 [FR] France ............................ 92 08988

[51] Int. Cl.⁵ .............................................. G02B 6/12
[52] U.S. Cl. ..................................... 385/14; 385/131
[58] Field of Search .................... 385/8, 14, 30, 131, 385/129, 130; 156/625, DIG. 111; 204/192.29

[56] References Cited
U.S. PATENT DOCUMENTS

| | | | |
|---|---|---|---|
| 5,103,493 | 4/1992 | Buchmann et al. | 385/14 |
| 5,134,671 | 7/1992 | Koren et al. | 385/14 |
| 5,193,131 | 3/1993 | Bruno | 385/14 |

OTHER PUBLICATIONS

D. Remiens et al., "GaInAsP/InP Integrated Ridge Laser With A Butt-Jointed Transparent ... " Sep. 1, 1990, pp. 2450-2453, Journal of Applied Physics vol. 68, No. 5, New York, USA.

Primary Examiner—John D. Lee
Assistant Examiner—Phan Thi Heartney
Attorney, Agent, or Firm—Blakely, Sokoloff, Taylor & Zafman

[57] ABSTRACT

The invention relates to a process for producing a structure with integrated optical waveguide and mirror, comprising the stages consisting in:
etching a substrate to form an inclined plane on the substrate,
depositing by epitaxy, on the face of the substrate carrying the inclined plane, various layers of materials capable of forming an optical waveguide,
clearing away the substrate, via its face opposite the epitaxed layers, up to the inclined plane, to form a mirror capable of reflecting light from the optical waveguide in a given direction.

12 Claims, 4 Drawing Sheets

PROCESS FOR FORMING A STRUCTURE WITH INTEGRATED OPTICAL WAVEGUIDE AND MIRROR, AND STRUCTURE OBTAINED

BACKGROUND OF THE INVENTION

1. Field of the Invention

The present invention relates to monolithic structures with integrated optical waveguide and mirror.

The expression "monolithic structure" designates a structure using a technology common to the production of various elements and not to a technique for assembling different components produced separately.

In the text of the present invention, the expression "optical waveguide" covers structures capable of guiding light passively as well as those capable of guiding light with amplification of the optical wave.

The present invention is applicable in particular to the field of optical telecommunications.

2. Background Information

A structure with integrated optical waveguide and mirror is described in document FR-A-2 655 775. More particularly, this document proposes producing a waveguide-photodetector structure by epitaxing on a flat substrate, various layers of materials needed to produce an optical waveguide and photodetector. The different epitaxed layers are then attacked either chemically or by some other means in order to form a mirror capable of reflecting light from the waveguide towards the photodetector.

FIG. 1 shows a waveguide-photodetector structure produced by a prior art process, such as that described in document FR-A-2 655 775. FIG. 1 shows a substrate 100, on which the following layers have been successively epitaxed: a lower confinement layer 110, a waveguide forming layer 120, an upper confinement layer 130, and a photodetective layer 140 which comprises a photodiode 150. The inclined mirror-forming plane 160 is produced by chemically attacking the different epitaxed layers 110, 120, 130 and 140 and reflects light from the optical waveguide-forming layer 120 towards the photodiode junction 150.

While the process used to obtain the structure with integrated optical waveguide and mirror proposed in document FR-A-2 655 775 constitutes a notable improvement over earlier proposed processes, comprising notably only a single epitaxy step, the structure nevertheless has the drawback of being costly and delicate to fabricate since the inclined mirror-forming plane 160 is produced with the aid of a succession of selective, and therefore different, chemical etches of epitaxial layers 110, 120, 130 and 140.

The salient edge 165 of the mirror 160 of the structure with integrated optical waveguide and mirror obtained by the process has also been found to be particularly fragile.

SUMMARY OF THE INVENTION

The object of the present invention is to propose a process for producing an improved structure with integrated optical waveguide and mirror which overcomes these drawbacks, characterized in that it comprises stages consisting in:

etching a substrate to form an inclined plane on the said substrate, depositing, by epitaxy, on the face of the substrate carrying the inclined plane, various layers of materials capable of forming an optical waveguide, clearing away the substrate, via its face opposite the said epitaxed layers, up to the inclined plane, to form a mirror capable of reflecting light from the optical waveguide in a given direction.

Preferably, the various layers of materials capable of forming the optical waveguide comprise:

a lower confinement layer, a waveguide layer capable of guiding light, and of a higher index than that of the lower confinement layer, an upper confinement layer, of a lower index than that of the waveguide layer.

When the substrate is cleared away by chemical means, the process of the invention also includes a stage consisting in:

depositing a stop etch layer on the substrate by epitaxy before depositing the various layers of materials capable of forming an optical waveguide.

In one embodiment of the invention, the substrate comprises indium phosphide, InP, the lower confinement layer InP, the waveguide layer quaternary material, GaInAsP, the upper confinement layer InP, the stop etch layer being of the same composition as the waveguide layer.

Where the process is applied more particularly to the production of a waveguide-photodetector structure, it is characterized in that it also includes a stage consisting in:

depositing a photodetective layer on the substrate by epitaxy, the mirror then being adapted for reflecting light from the optical waveguide towards the photodetective layer.

Where the process is applied more particularly to the production of a superluminescent diode structure, the process also includes a stage consisting in:

depositing, on the substrate, by epitaxy, at least one layer forming an active zone capable of amplifying light.

A further object of the present invention is a structure with integrated optical waveguide and mirror, obtained by implementing the process of the invention. This structure is characterized in that it comprises:

a substrate having two spaced regions of different heights, a plurality of layers deposited on the substrate by epitaxy, capable of forming an optical waveguide on at least one of the said regions, at least one of the layers extending between the two regions in an inclined plane to form a mirror capable of reflecting light from the optical waveguide in a given direction.

More particularly, in the case of a waveguide-photodetector structure, this advantageously comprises:

a substrate having two spaced regions of different heights, a plurality of layers deposited on the substrate by epitaxy, capable of forming an optical waveguide on at least one of the said layers as well as a photodetective layer, at least one of the said layers extending between the said regions, in an inclined plane, to form a mirror capable of reflecting light from the optical waveguide towards the photodetective layer.

Advantageously, the plurality of layers successively deposited by epitaxy on the substrate comprises:

a lower confinement layer, a waveguide layer capable of guiding light, of a higher index than that of the lower confinement layer, an upper confinement layer, of a lower index than that of the waveguide layer, a photodetective layer, and preferably, when the substrate is etched from the back by chemical means, the plurality of layers successively deposited by epitaxy on the substrate comprises:

a stop etch layer, a lower confinement layer, a waveguide layer capable of guiding light, of a higher index than that of the lower confinement layer, an upper confinement layer, of a lower index than that of the waveguide layer, a photodetective layer.

More particularly, in the case of a superluminescent diode structure, the plurality of layers deposited on the substrate by epitaxy, form an active superluminescent diode zone.

BRIEF DESCRIPTION OF THE DRAWINGS

A full understanding of the other characteristics and advantages of this invention can be gained from the following non-limiting, detailed description of a number of examples of the invention when read in conjunction with the accompanying drawings in which.

DESCRIPTION OF THE PREFERRED EMBODIMENTS

FIGS. 2 to 5 show the different stages of a process of the invention for producing a structure with integrated optical waveguide and mirror.

In accordance with the invention, an inclined plane is first of all etched on substrate 200. Substrate 200 may be etched by chemical means or by ionic machining using reactive or non-reactive ion beams, according to methods known in themselves. Preferably, the inclined plane is etched by chemical means. In a non-limiting example of the invention, substrate 200 comprises indium phosphide, InP.

We begin by producing a mask 220 on the InP substrate 200 by photolithography. Substrate 200 covered with mask 220 is then etched with the aid of an acid solution HCl (1 volume)+H$_3$PO$_4$ (1 volume) at ambient temperature, according to photolithography techniques known in themselves.

Figure 1:
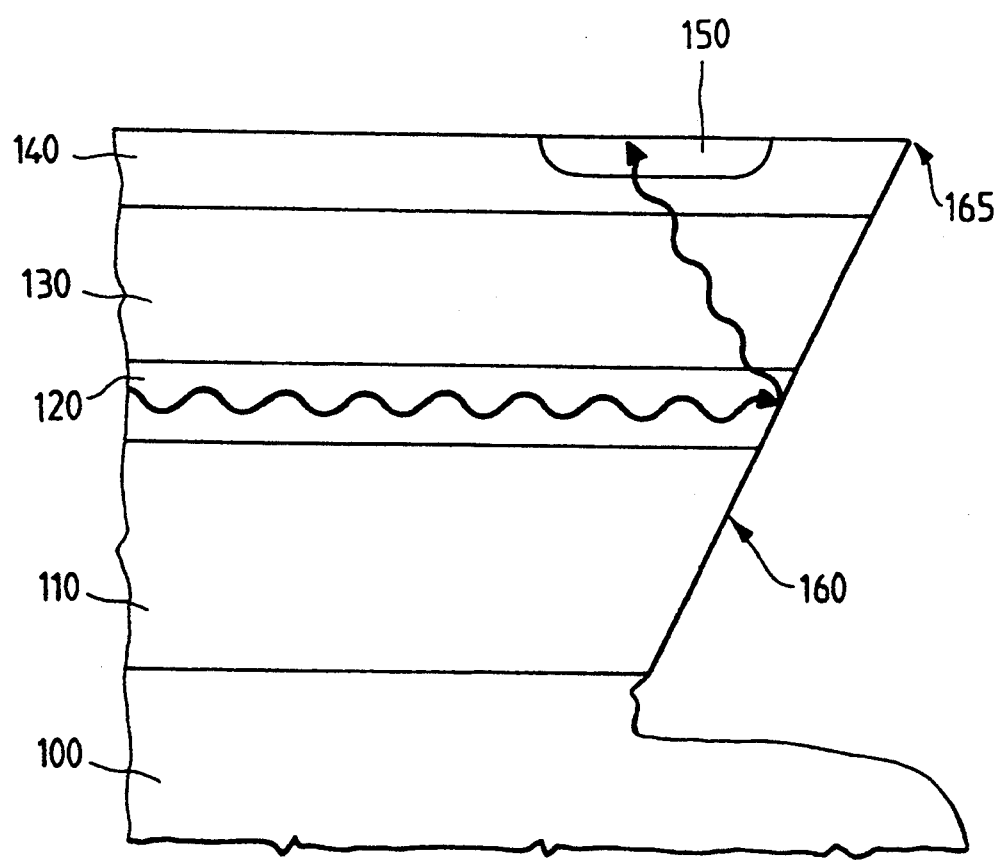
FIG. 1 is a cross-sectional view of a previously described structure with integrated optical waveguide and mirror, serving to illustrate the present state of the art.
Figure 2:
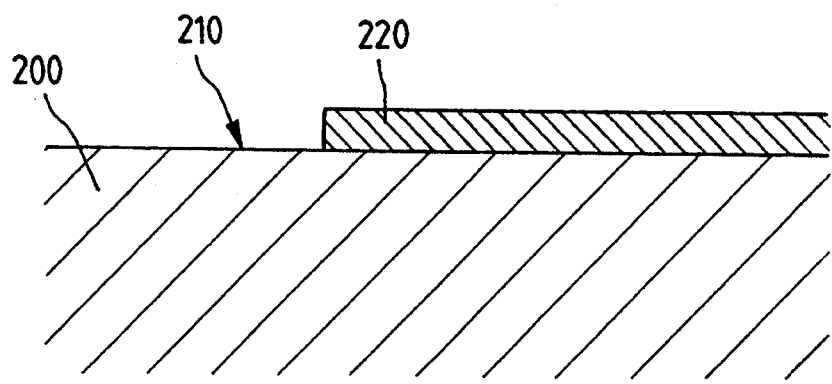
FIGS. 2 to 5 show, in schematic fashion, the different stages of a process of the invention.
Figure 3:
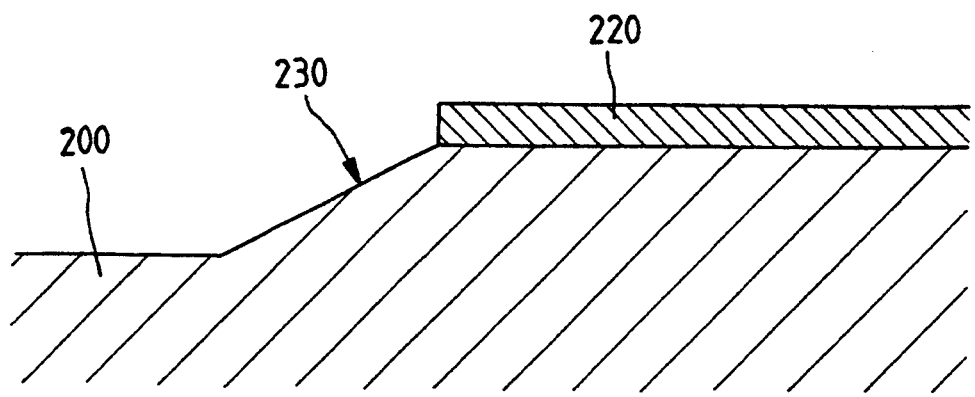

In the example shown in FIG. 2, the initial surface 210 of substrate 200 is flat and extends in a plane <100>. Throughout the rest of this description, the expression "height" will refer to a direction perpendicular to the plane of flat surface 210. Chemical etching is performed in privileged fashion in a crystalline plane <211> of substrate 200, which is designated by the reference 230 in FIG. 3. Substrate 200 is then made ready for covering by epitaxy with a set of layers capable of forming an optical waveguide.

Figure 4:
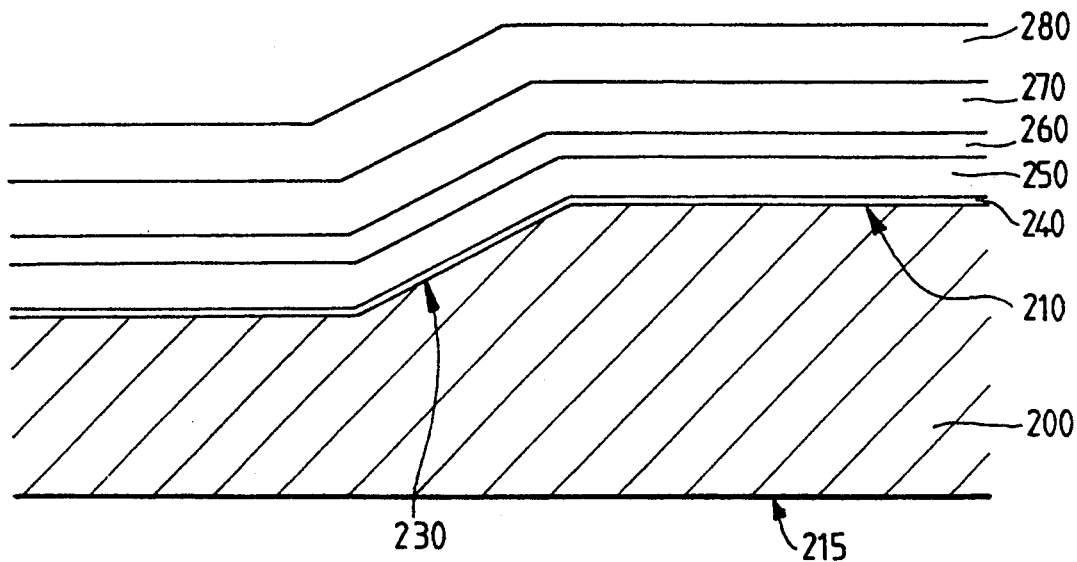
Figure 5:
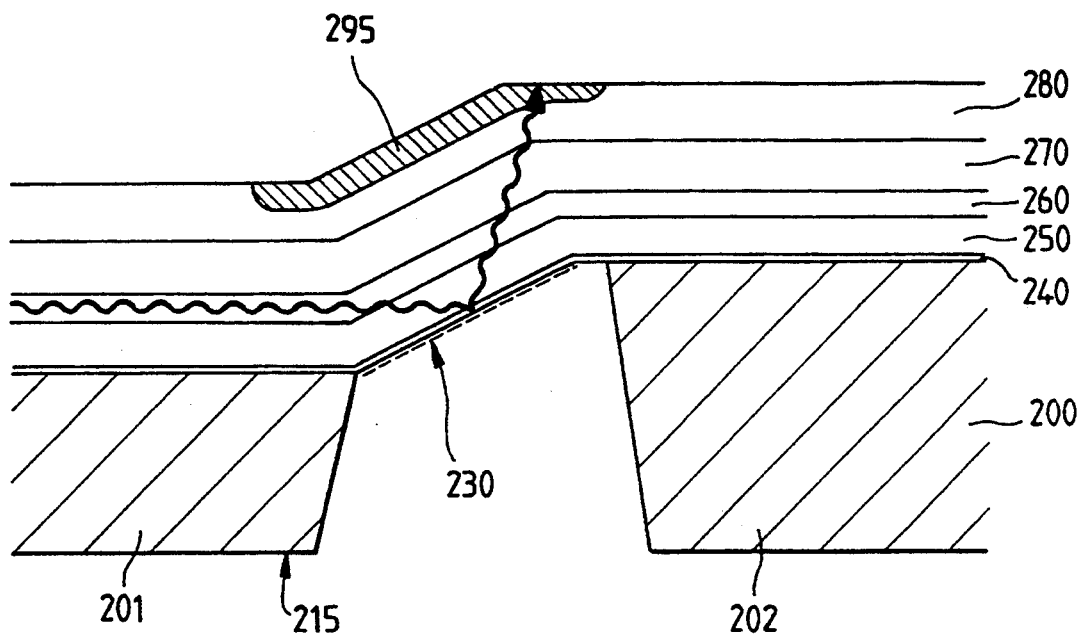

FIGS. 4 and 5, described below, refer more particularly to the application of the process of the invention to the production of a waveguide-photodetector structure.

FIG. 4 shows a stop etch layer 240, a lower confinement layer 250, an optical waveguide-forming layer 260, an upper confinement layer 270 and a photodetective layer 280, deposited successively by epitaxy on substrate 200. Note that the upper and lower confinement layers are produced from materials having a lower index than that of the waveguide layer 260 so as to form an optical waveguide.

Advantageously, the stop etch layer comprises quaternary material, InGaAsP, preferably having the composition In$_{0.72}$Ga$_{0.28}$As$_{0.61}$P$_{0.39}$ and 500 Å thick. The lower confinement layer 250 and upper confinement layer 270 comprise indium phosphide, InP, in the region of 1 µm thick. Waveguide layer 260 comprises quaternary material of the same composition as the stop etch layer and is in the region of 0.65 µm thick. Photodetective layer 280 is in the region of 2 µm thick and comprises ternary material, GaInAs, preferably having the composition Ga$_{0.47}$In$_{0.53}$As.

In accordance with the invention, substrate 200 is then locally cleared away on the back, i.e. from face 215 of substrate 200 opposite face 210, up to inclined plane 230, in order to form a mirror capable of reflecting light from waveguide layer 260 in a given direction, which, in the embodiment shown in FIG. 5, is towards photodetective layer 280.

Preferably, as described above, a stop etch layer 240 is deposited on substrate 200 at the time of epitaxy, and the back of substrate 200 is cleared away by chemical means, by producing, first of all, by photolithography, a mask having an opening at the level of inclined plane 230. Stop etch layer 240 is chosen in such a way that it protects the different layers 250, 260, 270, 280 deposited by epitaxy at the time of chemical attack to form the mirror.

Substrate 200 is locally attacked with an acid solution HCl (1 volume)+H$_3$PO$_4$ (1 volume), it being well understood that this is only an example and that these proportions may vary. One of the properties of this acid solution is that it etches InP at a speed in the order of 1.5 82 m/min at ambient temperature, while the quaternary material, GaInAsP, is only attacked at a speed less than 0.01 µm/min. Those skilled in the art understand quite easily that the stop etch layer considerably slows down the progression of the chemical attack performed locally on the back of the substrate when it reaches the level of inclined plane 230, and thus protects the set of layers 250, 260, 270, 280 deposited by epitaxy.

The integrated mirror thus formed has a reflecting face which coincides with inclined plane 230, and which is capable of reflecting light from waveguide layer 260 in a given direction. More particularly, in the case of the waveguide-photodetective structure shown in FIG. 5, the light is reflected towards a photodiode junction 295 formed on detective layer 280. This photodiode junction 295 is produced by depositing a masking layer, for example comprising silicon nitride, SiN$_x$, on the last layer 280 deposited by epitaxy, the photodiode junction 295 then being produced by P-type diffusion, for example zinc diffusion, through an opening made in this masking layer.

We can propose, without going beyond the scope of the invention, that the back of the substrate be cleared by ion machining, preferably reactive (selective attacking), with the aid of an ion beam.

We can also propose, without going beyond the scope of the invention, the choice of other materials (GaAs, GaAlAs, etc.), changing the composition of the substrate and of the different layers deposited by epitaxy, as well as their thickness, adapting them to the wavelength parameters of the light in the waveguide for example, or forming an active zone in the optical waveguide or in its vicinity capable of amplifying the optical wave, and even forming a laser structure (for example of the distributed feedback type (DFB)).

Figure 6:
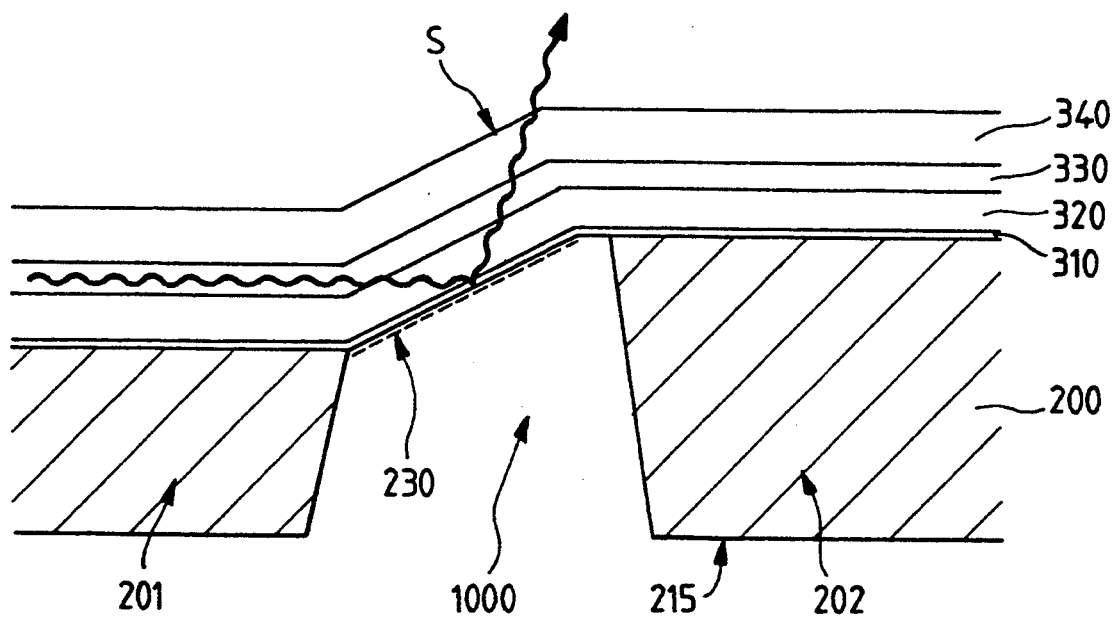
FIG. 6 is a cross-sectional view of a superluminescent diode structure obtained by implementing the process of the invention.

FIG. 6 shows a superluminescent diode structure obtained by implementing the process of the invention.

FIG. 6 shows a substrate 200 comprising two spaced disjointed regions 201 and 202, of different heights measured by taking as the origin the plane of face 215 of substrate 200, and a plurality of layers 310, 320, 330, 340 deposited by epitaxy on the two disjointed regions 201 and 202 of the substrate, extending between them in an inclined plane 230 to form a mirror which is capable of reflecting light from layer 330, which constitutes the active zone, towards the surface S of the structure.

In the embodiment described, substrate 200 comprises indium phosphide, InP, layer 310 is a stop etch layer comprising quaternary material, layer 320 is a lower confinement layer comprising InP, the layer forming the active zone 330 comprises quaternary material, and the upper confinement layer 340 comprises InP.

In the embodiment described in FIG. 6, the interior space 1000 with two spaced disjointed regions 201,202 is in contact with air, but we can propose filling this space, if necessary, with a low index filling material, taking care of course that the difference in index between the first layer deposited by epitaxy extending between the said spaced disjointed regions and the filling material is such that there is reflection on plane 230.

We can also propose depositing a metallization, represented by the dashed lines in FIGS. 5 and 6, on the back of the mirror in order to improve the mirror's reflective qualities.

Finally, the process which is the object of this invention is particularly advantageous since it only requires a single epitaxy stage and allows a mirror to be produced by simple techniques, for example by photolithography, and precise positioning of the mirror with respect to the waveguide.

The structures with integrated optical waveguide and mirror obtained using this procedure, whether waveguide-photodetective structures, superluminescent diode structures or laser structures are of low cost and particularly robust.

We claim:

1. Process for producing a structure with integrated optical waveguide and mirror, characterized in that it comprises stages consisting in:
    etching a substrate to form an inclined plane on the said substrate,
    depositing, by epitaxy, on the face of the substrate carrying the inclined plane, various layers of materials capable of forming an optical waveguide,
    clearing away the substrate, via its face opposite the said epitaxed layers, up to the inclined plane, to form a mirror capable of reflecting light from the optical waveguide in a given direction.

2. The process of claim 1 wherein a stop etch layer is also deposited on the substrate by epitaxy before depositing the various layers of materials capable of forming an optical waveguide.

3. The process of either one of claim 1 wherein it also includes the stage consisting in depositing a photodetective layer on the substrate by epitaxy, the mirror then being adapted for reflecting light from the optical waveguide towards the photodetective layer.

4. The process of claim 1 wherein the various layers of material capable of forming an optical waveguide comprise:
    a lower confinement layer,
    a waveguide layer capable of guiding light, of a higher index than that of the lower confinement layer,
    an upper confinement layer, of a lower index than that of the waveguide layer.

5. The process of claim 4 wherein the substrate comprises indium phosphide, InP, the lower confinement layer InP, the waveguide layer quarternary material, GaInAsP, the upper confinement layer InP, and the photodetective layer GaInAs.

6. The process of claim 5 wherein the stop etch layer is of the same composition as the waveguide layer.

7. The process of claim 1 wherein it also includes a stage consisting in:
    depositing, on the substrate, by epitaxy, at least one layer forming an active zone capable of amplifying light.

8. Structure with integrated optical waveguide and mirror obtained by implementing the process of claim 1 wherein it comprises:
    a substrate having two spaced regions of different heights,
    a plurality of layers deposited on the substrate by epitaxy, capable of forming an optical waveguide on at least one of the said regions, at least one of the layers extending between the two regions in an inclined plane to form a mirror capable of reflecting light from the optical waveguide in a given direction.

9. The structure of claim 8 wherein the said plurality of layers are successively deposited on the substrate by epitaxy and include:
    a lower confinement layer,
    a waveguide layer capable of guiding light, of a higher index than that of the lower confinement layer,
    an upper confinement layer, of a lower index than that of the waveguide layer,
    a photodetective layer.

10. The structure of claim 8 wherein the said plurality of layers are successively deposited on the substrate by epitaxy and include:
    a stop etch layer,
    a lower confinement layer,
    a waveguide layer capable of guiding light, of a higher index than that of the lower confinement layer,
    an upper confinement layer, of a lower index than that of the waveguide layer,
    a photodetective layer.

11. The structure of claim 10 wherein the substrate comprises InP, the stop etch layer GaInAsP, the lower confinement layer InP, the waveguide layer GaInAsP, the upper confinement layer, InP and the photodetective layer GaInAs.

12. The structure of claim 8 wherein the said plurality of layers deposited by epitaxy also form an active superluminescent diode zone.

* * * * *